July 7, 1970
H. W. GERARDE
3,518,804
PIPETTE ASSEMBLY HAVING PRECISE QUANTITY STABILIZED
REAGENT IN LIQUID FORM AND METHOD OF PREPARING SAME
Filed Nov. 1, 1966
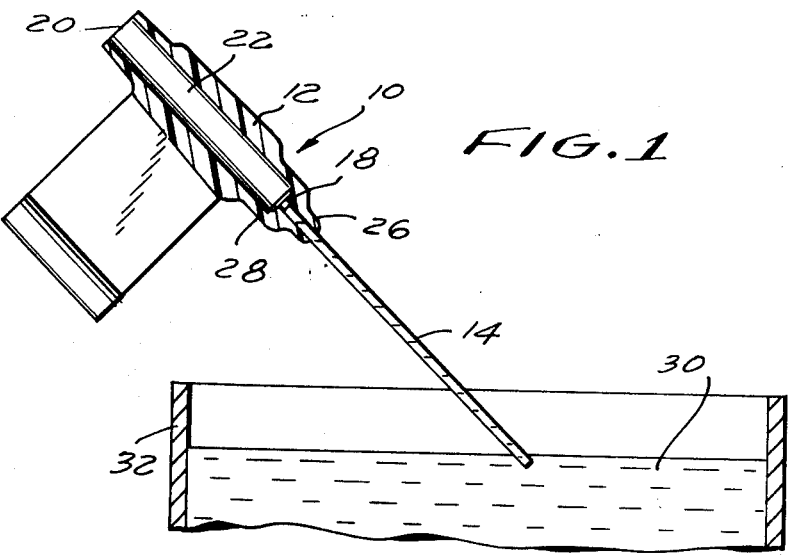
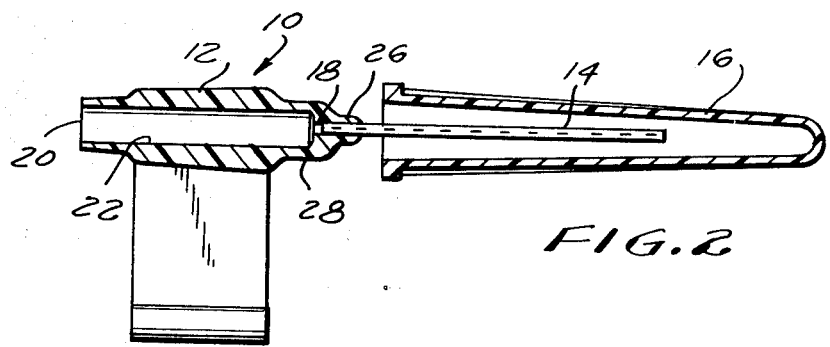
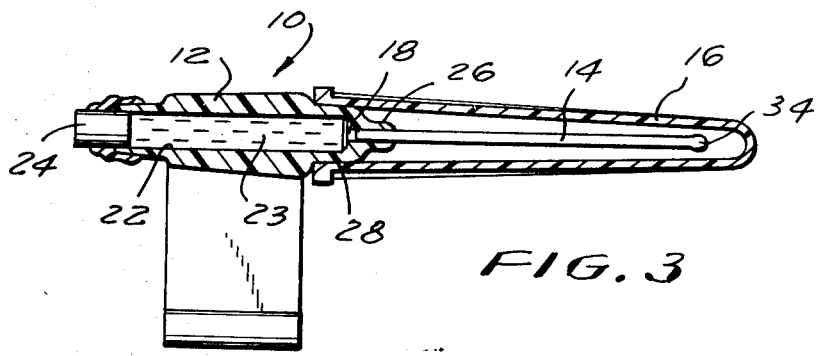
INVENTOR
*HORACE W. GERARDE*
BY
*Kane, Dalimier, Kane y Smith*
ATTORNEYS United States Patent Office 3,518,804
Patented July 7, 1970

3,518,804
PIPETTE ASSEMBLY HAVING PRECISE QUANTITY STABILIZED REAGENT IN LIQUID FORM AND METHOD OF PREPARING SAME
Horace W. Gerarde, 40 Knoll Road, Tenafly, N.J. 07670
Filed Nov. 1, 1966, Ser. No. 591,670
Int. Cl. B01l 3/02
U.S. Cl. 53—37                                 3 Claims

ABSTRACT OF THE DISCLOSURE

A pipette assembly having a molded body with an internal chamber and an accurately calibrated capillary tube mounted on the body so as to be in fluid communication with the chamber. A predetermined micro measurement of a stabilized dry reagent per unit volume of an anhydrous liquid stored within the chamber thereby adapting the assembly for use in micro-analytical test procedures.

This invention relates to a pipette assembly having a precise quantity of stabilized reagent in liquid form disposed within a chamber thereof and to the method for introducing the precise quantity the same. More particularly it relates to the provision of such a pipette assembly having a stored stabilized liquid reagent for use in analytical procedures, such as the determination of particular constituents or compounds in fluids, principally biological fluids, by employing micro, ultra-micro and sub-micro procedures.

Present laboratory analytical techniques, utilizing micro procedures, are time consuming to perform and require both expensive and accurately calibrated equipment for dispensing precise quantities of liquid reagent. Further, performance of procedures of this type require highly trained personnel or technicians having a high degree of skill and dexterity. The ultimate result is that the cost of micro analytical procedures is greatly increased due to the necessity to maintain expensive equipment, to employ skilled personnel and the time required by such personnel to perform the procedures. Further still, the liquid reagent to be employed in any micro analytical procedure must be accurately prepared so that the reagent employed is of a precise quantity per total unit volume. Oftentimes, the reagent, prepared from a stable solid, is unstable in the presence of water and consequently must be freshly prepared on a day to day basis due to the rapid deterioration of the reagent in the presence of water. As may be expected this daily preparation is also time consuming and there is always the chance that continual repetition will develop laxity in the technician. Additionally, and of utmost importance daily preparation results in waste and uncalled-for expense. This may be explained through the appreciation that it is impossible to weigh and dispense micro quantities of a solid reagent. Therefore, macro quantities of the reagent in solution must be employed with subsequent dilutions to prepare micro quantities per unit volume. Thus, under normal day to day circumstances substantial quantities of the prepared reagent are not used, and of necessity, are thrown away due to instability of the solution. With some reagents the day to day preparation is economically unpractical.

It is therefore an object of this invention to provide a pipette assembly having a precise quantity of a prepared stabilized reagent in liquid form disposed and stored within a chamber of the assembly thereby to be ready for use when performing a micro analytical procedure. Thus, the need to maintain a stock solution or a dilute solution for pipetting a price quantity of reagent to be used in analytical procedures is obviated. Similarly, the requirement of maintaining expensive and accurately calibrated equipment for dispensing precise quantities of liquid reagent is eliminated. As contemplated by this invention, the pipette assembly is ready for use in analytical procedures and contains a precise quantity of stabilized reagent in liquid form. After use the pipette assembly may be discarded.

Another object of my invention is to provide a method for introducing a precise quantity of stabilized reagent into a pipette assembly to be stored by the latter and subsequently used in the performance of micro analytical procedures.

A further object of my invention is to provide a pipette assembly storing a precise quantity of stabilized reagent in liquid form therein which is inexpensixe to manufacture and easy to use thereby eliminating the necessity of employing highly trained technicians for performing micro analytical procedures, substantially eliminating the possibility of contaminating stock solutions and errors that occur in day to day preparations of liquid reagents for use in micro-analytical procedures.

Other objects and advantages of the present invention will become apparent to those skilled in the art as the following description is developed.

In a broad sense the invention is directed to a micro pipette assembly having therein a stored precise micro measurement of stabilized dry reagent per unit volume of an anhydrous liquid for subsequent use in micro analytical procedures. The assembly comprises a body member provided with a pair of openings and an intercommunicating chamber portion which contains the precise micro measurement. A capillary pipette having an accurately calibrated bore adapted to receive and maintain the measured volume of liquid is mounted on the body in sealing relation with one of said openings so that the capillary bore is in fluid communication with the chamber. Means in the form of a sheath for covering the capillary pipette is received on the body member in a manner so that the measured liquid volume disposed within the capillary bore is transferred into the chamber by the pressure increase within the sheath upon mounting. Means are also provided for sealing said chamber and measured liquid volume from the atomsphere.

The invention also contemplates the method of introducing and storing a prepared stabilized liquid reagent within the chamber portion of a micro pipette assembly. The method comprises the steps of preparing a stabilized mixture containing a liquid carrier and a precise measurement of reagent; drawing a predetermined volume of the stabilized mixture into an accurately calibrated bore of a micro pipette assembly; subsequently transferring said predetermined volume from said bore to said chamber; and thereafter sealing the chamber of said pipette assembly and stabilized liquid reagent from the atmosphere.

In the accompanying drawing which illustrates a preferred embodiment of the present invention:

FIG. 1 is an elevational view in section showing the capillary pipette assembly partially immersed in a prepared solution;

FIG. 2 is an elevational view in section showing the pipette assembly and sheath during the mounting of the latter; and FIG. 3 is a view similar to FIG. 2 showing the stabilized liquid reagent disposed within the chamber of the assembly and isolated from the atmosphere.

In the drawing, the pipette assembly for storing a precise quantity of stabilized reagent in liquid form is generally designated by the numeral 10. The assembly comprises a body member 12, a capillary tube 14 and a sheath 16.

The body is to be relatively rigid and may be formed of a resin or plastic that is chemically inert to various materials with which it comes in contact and may be fabricated by any of the recognized procedures, such as by molding. Various materials that may be used are polyethylene, polypropylene, polyamide or polyvinylchloride and the like. Preferably the body should be either transparent or translucent thereby to allow visual inspection, as will be discussed, so as to determine both the passage of liquid reagent from the capillary tube to the body chamber and vice versa.

As shown in the figures, the body is provided with a pair of openings 18 and 20 that are spaced apart and inter-communicated by a chamber 22. The chamber serves as a reservoir for the receipt and storage of a precise quantity of a stabilized liquid reagent 23.

Opening 20 is generally of a size equal to the internal diameter of the body and may, once the quantity of stabilized liquid reagent is introduced in chamber 22 and the capillary bore sealed, be sealed by a plug 24. To maintain a positive sealing relation between the plug and the inner wall of the body thereby to prevent liquid loss, the plug is normally of a diameter slightly in excess of the chamber diameter. A wax seal (FIG. 3) may also be provided around the plug and body to insure a more positive seal.

The opening 18, provided within a protruding neck or hub portion 26, is in the form of a longitudinal bore within which capillary tube 14 may be partially received in sealing relationship therewith. The length of the bore, therefore, gives stability to the tube when thus mounted.

Joining the hub portion to the body is a relatively flat tapered portion 28 upon which the sheath 16 is slidably received and frictionally maintained. With the sheath removed, the taper also permits the body portion with the extending capillary tube to be slidably received and frictionally held within the open end portion of a container (not shown) that may hold other reagents necessarily employed when performing one of many analytical procedures. This container may be of the flexible type and due to the frictional fit of the body 12 within the container neck commonly practiced aspirating procedures may be employed to draw the quantity of stabilized liquid reagent from the chamber 22. By aspirating a second or third time the chamber may be washed. Repeated aspiration assures that the entire volume of liquid is drawn from the chamber.

The capillary tube 14 is opened at both ends and is of a size and shape such that it will receive a predetermined quantity of solution 30. The internal diameter of the tube is relatively small thereby to cause the solution to rise due to capillary action. The capillary tube 14 is mounted on the body 12 by receiving one end within the opening 18. Any suitable means, such as a friction fit, may be employed to maintain the interconnected relationship of parts.

The solution 30, disposed within a container 32, is of a precisely measured volume of anhydrous solvent or carrier in which there is dissolved a precise quantity of solid reagent. The reagent, which is generally unstable in liquid form, is prepared in such a manner so as to prevent the reagent employed from deteriorating or otherwise becoming unstable over a long period of time. Normal laboratory procedures are used to prepare a precise quantity of solid reagent in a solution, for example, where the amount of reagent per cubic centimeter of solution is less than one milligram several dilutions of a stock solution may be required so as to accurately and precisely obtain a solution having solid reagent dissolved therein within the micro or ultra-micro range. Thus, the solution 30 is prepared in accordance with macro techniques as are well known and the proper dilution of an accurate macro measured amount of reagent will produce a precise quantity of reagent per unit volume of liquid solvent.

Capillary tube 14 preferably should be made of a material that will not break during careful handling or usage. Glass or plastic materials that are inert to and unaffected by a reagent that may be drawn therethrough may be used. Glass is preferred since it is both an inert substance and further has a transparent characteristic so that the height of the liquid column therein is readily discernible.

The capillary is formed with a uniform bore of small diameter and has a predetermined length corresponding to a predetermined volume such that said predetermined volume may be achieved by filling the bore with liquid. Due to the small diameter of the bore, liquid will rise in the known manner to completely fill the same.

Sheath 16 may, if preference dictates, form a part of the pipette assembly and may be an elongated hollow member that is mounted on the body 12, thereby to envelop and provide protection for the capillary tube. The sheath provides an additional and important function as will be discussed. The sheath may be fabricated from a material, such as polyethylene or polypropylene of the type that is resilient and compressible.

The implementation of the pipette assembly having a precise quantity of stabilized liquid reagent stored therein is relatively simple. The basic steps are diagrammatically shown in the figures. A solution having a precise quantity of reagent per unit volume is prepared as discussed above. The capillary tube of the pipette assembly (FIG. 1) is introduced into the solution 30 so that the solution rises within and completely fills the capillary bore. When the bore is completely filled the capillary is removed from the solution and the outer surface is wiped, from the hub downward, with a suitable gauze material to remove excess solution adhering to the outer surface. Care should be taken so that the gauze does not contact the open bore of the capillary since it will act to absorb the solution.

Once the surface of the capillary is wiped dry the liquid column is transferred to chamber 22. Transfer is accomplished by implementation of sheath 16. Thus, the sheath is mounted upon the hub as shown in FIG. 2. During mounting the air trapped within the sheath will be slightly compressed resulting in a pressure increase. The increased pressure will force the liquid column from the bore into the area 18 at the junction of the bore and chamber 22. A slight compression of sheath 16 causes the solution to enter completely the chamber. Removal of the compressive force on the sheath has no effect on the solution which remains within the chamber.

When transfer has been accomplished the capillary tip may be sealed, if desired, by flame heating at 34, in accordance with conventional practices. The tip may also be sealed by wax. Chamber 22 is sealed by plug 24 so that the stabilized liquid reagent is isolated from the atmosphere. Thus, the reagent will maintain its stability over long periods of time.

The assembly, containing a stabilized reagent in liquid form, may thereafter be packaged, distributed and subsequently used in suitable ultra-micro or micro analytical procedures. Generally, prior to packaging, the sheath is located on the body to provide protection for the capillary.

As may be apparent other procedures may be employed to transfer the liquid column from the capillary bore to the chamber, for example, by applying a mild aspirating force at the open end 20 or flame heating the end of the mounted sheath. The former procedure, therefore, is one of many that may be employed and has been practiced with good results.

As set forth above, the anhydrous solvent or carrier employed in certain procedures may vary greatly and may be, for example, a glycol or polyglycol, such as ethylene or polypropylene glycol, or ethers, such as dioxane or other hydrocarbon solvents. Moreover, the solvent employed should be one that is both inert to the biological fluid to be tested and will not adversely affect the constituents used in performing a specific test.

In other words, the organic solvent should be neutral to the material employed for performing the specific test.

EXAMPLE 1

The following example illustrates the preparation of an anhydrous organic solution for use in dissolving a reagent which is otherwise unstable in solution.

To one liter of ethylene glycol add 50 grams of anhydrous sodium sulfate and 10 grams of marble chips (calcium carbonate) of approximately ¼" in size. Vigorously shake or stir the resulting mixture and allow it to stand for a period of from three to four days with daily agitation. After the last agitation, the mixture is allowed to settle for a day.

The clear supernate is decanted. This organic solution is both neutral and anhydrous.

It should be apparent that any of the foregoing recited compounds may be treated in a similar manner to obtain an organic anhydrous solution.

Many biological test procedures employ reagents which when stored under proper conditions in dry form are stable but when placed in aqueous solutions, suspension or the like are unstable. Enzymes, coenzymes, dyes, etc. are illustrative of types of compounds which are otherwise unstable in aqueous solutions. For example, mercuric chloranilate for use in performing a chloride determination and diacetyl monoxime-thiosemicarbazide reagent (DAM-TSC) are substances which are otherwise unstable in water.

EXAMPLE 2

(Preparation of stabilized reagent in liquid form for storing in a pipette assembly)

2.5 grams of mercuric chloranilate is added to one liter of anhydrous neutral ethylene glycol, prepared in accordance with Example 1, to form a suspension.

One milliliter of this suspension is diluted by adding it to 999 ml. of neutral anhydrous solution so that the resulting suspension contains 2.5 micrograms of mercuric chloranilate per milliliter.

A pipette, as described, having a precise calibrated capillary tube with a volume of, for example, 20 microliters is immersed in the mixture so that 20 microliters of the mixture is drawn into the bore by capillary action.

By employing a mild suction or by placing the sheath on the body (as described) the liquid column is forced into the chamber of the pipette assembly.

The capillary tube tip may then be flame heated to seal the end and the chamber is closed to the atmosphere by a plug and wax seal. The pipette assembly having the stored reagent volume is thus capable of storage and subsequent use in a chlorine determination test.

By employing other reagents that are otherwise unstable in liquid form and using a particular quantity of reagent per microliter for a capillary tube having a specific volume other pipette assemblies may be prepared for use in other procedures.

When the pipette assembly is to be employed in a micro analytical procedure, the sheath is removed and the sealed end of the capillary is broken off. Thereafter the plug is removed and the reagent is sucked through the capillary, by the procedure aforedescribed, or by other appropriate means so that the chamber reagent is mixed with other components to be used in the particular analytical procedure. No measuring of the stabilized chamber reagent is required. There is no need to utilize highly accurate and precision instruments for measuring and dispensing precise measurements of reagent to be used in any test procedure nor is it necessary to prepare a solution having a precise quantity reagent therein. As should be appreciated, ordinary laboratory technicians with ordinary skill may perform the test and the pipette assembly is constructed so as to be disposable after a single use.

From the foregoing it should be apparent that the objects of the invention are carried out and that the disclosed pipette assembly may be advantageously employed in the performance of analytical procedures requiring the introduction and interaction of precise micro measurements of reagents to certain testing solutions. By this invention this micro measurement of reagent is maintained and stored within the chamber of the pipette assembly.

While the foregoing discloses but a preferred embodiment of the pipette assembly this disclosure is not intended to limit the invention for clearly modifications may be made without departing from the spirit and scope of the invention as defined by the appended claims.

Having described the invention what is claimed is:

1. The method for providing and storing a precise micro measurement of stabilized dry reagent per unit volume of an anhydrous liquid within a body chamber of a micro pipette assembly in which a micro pipette having an accurately calibrated bore is mounted by the body in communication with the chamber, said body chamber being capable of frictionally mounting a compressible reagent container such that said pipette is inserted within said container whereby the reagent to be stored within said body chamber may be aspirated from the chamber through the micro pipette and mixed with the reagent contained within said compressible container, said method comprising:

preparing a stabilized mixture containing an anhydrous liquid carrier of known volume and precise measurement of dry reagent;

introducing said pipette into said stabilized mixture and supplying the chamber with a predetermined volume of said mixture by drawing a predetermined volume of the mixture into said accurately calibrated bore of said pipette by the forces of capillary action and thereafter transferring the predetermined volume to said body chamber; and sealing the pipette assembly body chamber and contained predetermined liquid volume at both ends from the atmosphere for storage thereby to maintain stability of the liquid volume.

2. The invention in accordance with claim 1 wherein after said predetermined volume of the mixture is drawn into said pipette pressure is applied thereto to transfer the predetermined volume to said body chamber.

3. The invention in accordance with claim 2 wherein a hollow sheath is removably mounted on said assembly so as to completely envelop the micro pipette after the predetermined volume of mixture is positioned therein so that a pressure increase within the sheath forces said predetermined volume from said bore to said chamber.

References Cited

UNITED STATES PATENTS

| | | | |
|---|---|---|---|
| 2,290,857 | 7/1942 | Booye et al. | 128—276 |
| 2,940,448 | 6/1960 | Furlong | 128—276 |
| 2,965,255 | 12/1960 | Gerarde | 128—276 X |
| 3,322,114 | 5/1967 | Portnoy et al. | 23—230 |

MORRIS O. WOLK, Primary Examiner

E. A. KATZ, Assistant Examiner

U.S. Cl. X.R.

23—259, 292; 73—425.4; 141—26